United States Patent
Gore (10) Patent No.: US 10,030,933 B2
(45) Date of Patent: Jul. 24, 2018

(54) GAS SPRING ASSEMBLY AND A CATCH THEREFOR

(71) Applicant: Thomas Gore, Pinckney, MI (US)

(72) Inventor: Thomas Gore, Pinckney, MI (US)

(73) Assignee: Thomas Gore Living Trust, Pinckney, MI (US)

( * ) Notice: Subject to any disclaimer, the term of this patent is extended or adjusted under 35 U.S.C. 154(b) by 0 days.

(21) Appl. No.: 15/247,089

(22) Filed: Aug. 25, 2016

(65) Prior Publication Data

US 2018/0058801 A1    Mar. 1, 2018

(51) Int. Cl.
| | |
|---|---|
| *F41B 11/64* | (2013.01) |
| *F16F 9/02* | (2006.01) |
| *F41B 11/723* | (2013.01) |
| *F41B 11/73* | (2013.01) |
| *F41B 11/70* | (2013.01) |
| *F41A 19/12* | (2006.01) |

(52) U.S. Cl.
CPC ............... *F41B 11/64* (2013.01); *F16F 9/02* (2013.01); *F41A 19/12* (2013.01); *F41B 11/70* (2013.01); *F41B 11/723* (2013.01); *F41B 11/73* (2013.01)

(58) Field of Classification Search
CPC ...................................................... F41B 11/64
See application file for complete search history.

(56) References Cited

U.S. PATENT DOCUMENTS

| | | | | |
|---|---|---|---|---|
| 4,282,852 | A * | 8/1981 | Omana | F41B 11/683 124/67 |
| 5,193,517 | A * | 3/1993 | Taylor | F41B 11/64 124/65 |
| 5,570,676 | A * | 11/1996 | Gore | F41B 11/642 124/56 |
| 5,599,302 | A * | 2/1997 | Lilley | A61M 5/30 604/135 |
| 5,919,159 | A | 7/1999 | Lilley et al. | |
| 6,170,477 | B1 * | 1/2001 | Horlock | F41B 11/83 124/61 |
| 2015/0354918 | A1 * | 12/2015 | Gore | F41B 11/642 124/66 |

* cited by examiner

*Primary Examiner* — Stephen Johnson
*Assistant Examiner* — Joshua T Semick
(74) *Attorney, Agent, or Firm* — Quinn IP Law

(57) ABSTRACT

A gas spring assembly includes an interior piston tube disposed within an interior pressure chamber of a piston. A bushing is slideably disposed between an annular wall of the piston and the interior piston tube. A catch is attached to the interior pressure tube, and includes a body having a cylindrical portion defining a circular cross section perpendicular to and concentric with a longitudinal axis of the piston. The body of the catch includes an exterior surface defining an outer diameter. A bore extends along a bore axis into the cylindrical portion of the body, and defines a circular cross section having a bore diameter, perpendicular to and concentric with the bore axis. The bore diameter of the bore is less than the outer diameter of the cylindrical portion of the body. The catch is formed by plunging an end mill into the cylindrical portion of the catch.

25 Claims, 5 Drawing Sheets

GAS SPRING ASSEMBLY AND A CATCH THEREFOR

TECHNICAL FIELD

The disclosure generally relates to a catch for engaging a sear of a trigger assembly of a firearm, and to an air gun having a gas spring assembly including the catch.

BACKGROUND

An air gun is a rifle, pistol, etc., which utilizes a compressed gas to fire a projectile. Air guns may be powered by, for example, a coil spring assembly or a gas spring assembly.

Air guns typically include a compression tube that defines a compression chamber, and is attached to a trigger assembly. A barrel is attached to the compression tube and is in fluid communication with the compression chamber. When powered by a coil spring assembly, the coil spring assembly is housed within the compression chamber of the rifle. The coil spring assembly includes a coil spring coupled to a piston. Cocking the gun moves the piston, which compresses the coil spring until a catch at the rear of the piston engages a sear on the trigger assembly. Actuating the trigger assembly releases the sear of the trigger assembly from the catch, and allows the coil spring to decompress, pushing the piston forward, and thereby compressing the gas, i.e., air, in the compression chamber directly behind the projectile. Once the air pressure rises to a level sufficient to overcome any static friction between the projectile and the barrel, the projectile moves forward within the barrel, propelled by an expanding column of gas.

The coil spring assembly permits use of a center, i.e., an in-line catch, wherein the piston includes a rod that extends along a central, longitudinal axis of the piston. The rod includes the catch which is generally in-line and concentric with a longitudinal axis of the piston. Accordingly, the sear engages the catch substantially in-line with the longitudinal axis of the piston, instead of off-line, radially spaced from the longitudinal axis of the piston, adjacent an outer radial wall of the piston. Such an in-line latching system reduces torque in the spring assembly, which increases the efficiency of the spring assembly and the power of the air gun.

When the air gun is powered by a gas spring assembly, the gas spring assembly is housed within the compression chamber of the rifle. The gas spring assembly includes a piston that defines a sealed interior pressure chamber disposed within the piston. The interior pressure chamber contains a gas, such as air or nitrogen. The piston is slideably disposed over a rod. Cocking the gun moves the piston over the rod, such that the rod displaces the gas within the interior pressure chamber, thereby compressing the gas within the interior pressure chamber, until a catch on the rear of the piston engages the sear on the trigger assembly. Actuating the trigger assembly releases the sear of the trigger assembly and allows the gas spring assembly to decompress, pushing the piston forward, and thereby compressing the gas, i.e., air, in the compression chamber directly behind the projectile. Because the rod is disposed concentric with the piston about the longitudinal axis of the piston, it is difficult to configure an air gun including both an in-line latching system and a gas spring assembly.

SUMMARY

A gas spring assembly for an air gun is also provided. The gas spring assembly includes a piston having an annular wall that extends along a longitudinal axis, between a rearward end and a forward end. The annular wall of the piston defines an interior pressure chamber. An interior piston tube is disposed within the interior pressure chamber. The interior piston tube includes a first end fixed in position relative to the forward end of the piston, and a second end disposed adjacent the rearward end of the annular wall of the piston. A bushing is slideably disposed between the annular wall of the piston and the interior piston tube. The bushing radially supports the interior piston tube relative to the annular wall of the piston. A catch is attached to the interior pressure tube. The catch includes a body extending along the longitudinal axis, between a first end and a second end. The first end of the body of the catch is attached to the second end of the interior piston tube. The catch includes an edge that is operable to engage a sear of a trigger assembly in latching engagement.

A catch for latching engagement with a sear of a trigger assembly of a firearm is provided. The catch includes a body extending along a central axis. The body extends between a first end and a second end. The body includes a cylindrical portion disposed adjacent the second end. The cylindrical portion defines a circular cross section, perpendicular to and concentric with the central axis, and includes an exterior surface defining an outer diameter. The body includes a bore extending along a bore axis, into the cylindrical portion of the body. The bore defines a circular cross section having a bore diameter, perpendicular to and concentric with the bore axis. The bore axis is perpendicular to the central axis. The bore diameter is less than the outer diameter.

A method of manufacturing a catch for a firearm is also provided. The method includes providing a body having a cylindrical portion. The cylindrical portion has a circular cross section, perpendicular to and concentric with a central axis, and includes an exterior surface defining an outer diameter. An end mill is plunged into the cylindrical portion of the body, along a bore axis, to form a bore. The bore includes a circular cross section perpendicular to and concentric with the bore axis, and defines a bore diameter that is less than the outer diameter of the cylindrical portion. The end mill is then retracted from the bore.

A sear of a trigger assembly engages an edge of the bore at the exterior surface of the catch. The method of manufacturing the catch is simple, and provides a strong and robust end product. The catch may be incorporated into a gas spring assembly to enable in-line latching with a gas spring assembly.

The above features and advantages and other features and advantages of the present teachings are readily apparent from the following detailed description of the best modes for carrying out the teachings when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Figure 1:
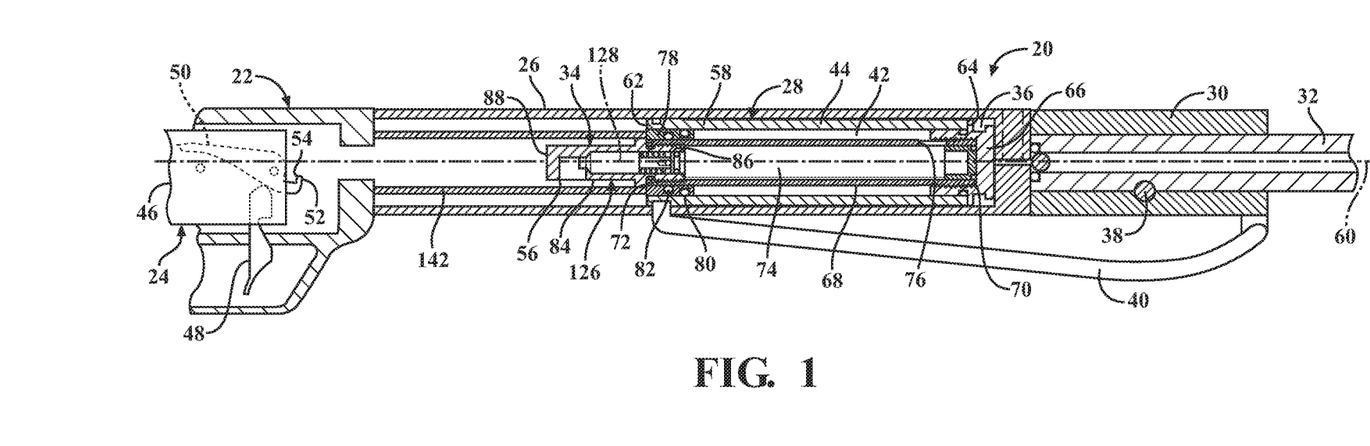
FIG. 1 is a schematic cross sectional view of an air gun showing a gas spring assembly having a piston disposed in an un-compressed position, with a catch of the gas spring assembly de-latched from a sear of a trigger assembly.
Figure 2:
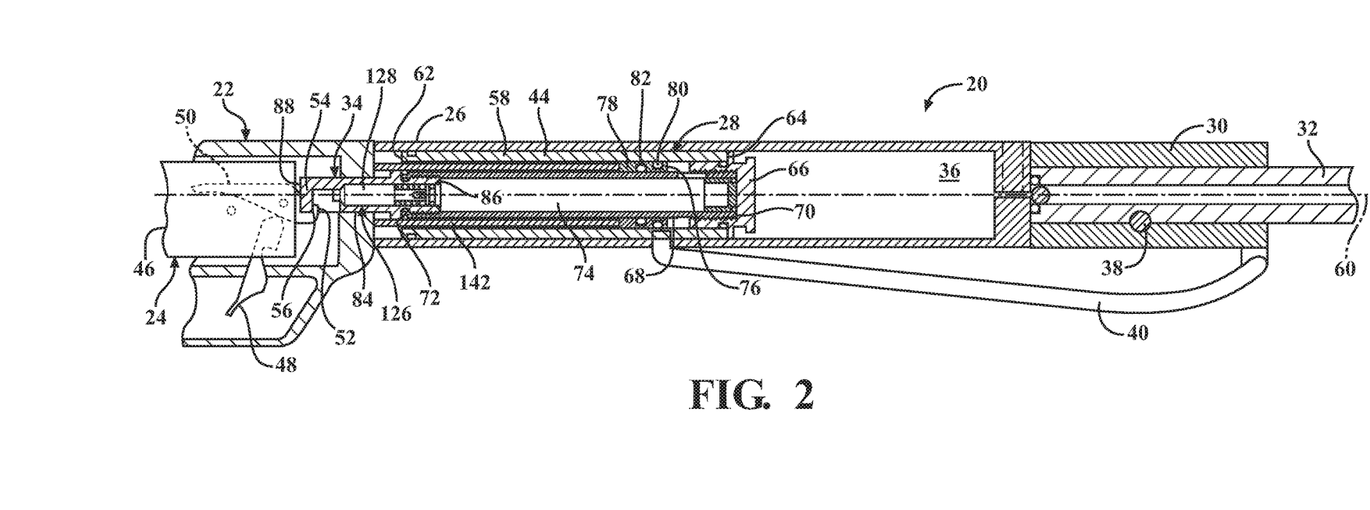
FIG. 2 is a schematic cross sectional view of the air gun showing the piston in a compressed position, with the catch of the gas spring assembly latched to the sear of the trigger assembly.

Referring to the Figures, wherein like numerals indicate corresponding parts throughout the several views, an air gun is generally shown at 20. Referring to FIGS. 1 and 2, the air gun 20 includes a stock (not shown), a trigger housing 22 supporting a trigger assembly 24, a compression tube 26 supporting a gas spring assembly 28, and a breech block 30 supporting a barrel 32. The compression tube 26 is attached to the trigger housing 22. The breech block 30 is disposed adjacent the compression tube 26. Preferably, the barrel 32 is press fit into or otherwise attached to the breech block 30. The air gun 20 utilizes a burst of compressed air to fire a projectile. The air gun 20 shown in FIGS. 1 and 2 may be described as a break barrel 32 style air gun 20. However, it should be appreciated that the teachings of the disclosure may be incorporated into other styles of air guns 20, such as but not limited to fixed barrel style air guns. Furthermore, other aspects of the teachings of this disclosure, such as the shape and manufacture of a catch 34, described in greater detail below, may be applied to firearms other than air guns 20, such as traditional firearms that ignite a propellant to fire the projectile.

Referring to FIGS. 1 and 2, the compression tube 26 defines a compression chamber 36, with the gas spring assembly 28 disposed within the compression chamber 36. The compression chamber 36 is in fluid communication with the barrel 32. The breech block 30 and the barrel 32 are pivotable relative to the compression tube 26 about a shaft 38, between a firing position and a cocking position as is well known. A lever 40 interconnects the breech block 30 and the gas spring assembly 28. Movement of the breech block 30 and barrel 32 from the firing position into the cocking position moves the lever 40, which in turn moves the gas spring assembly 28 from an un-compressed position, shown in FIGS. 1 and 3, into a compressed position, shown in FIGS. 2 and 4, thereby compressing a gas within the gas spring assembly 28. Movement of the breech block 30 and the barrel 32 from the firing position into the cocking position also moves the trigger assembly 24 from a de-cocked position, shown in FIG. 1, into a cocked position, shown in FIG. 2, and latches the trigger assembly 24 to the catch 34 of the gas spring assembly 28. Once the barrel 32 is moved back into the firing position, the air gun 20 is ready to fire.

As noted above, the gas spring assembly 28 includes a pressurized gas, such as air or nitrogen, which is disposed within an interior pressure chamber 42 of a piston 44 of the gas spring assembly 28. The gas spring assembly 28 is configured for compressing the pressurized gas within the interior pressure chamber 42 of the piston 44, in response to movement of the gas spring assembly 28 from the un-compressed position into the compressed position.

The trigger assembly 24 is housed within and supported by the trigger housing 22. As noted above, the trigger assembly 24 is moveable between the cocked position and the de-cocked position. The cocked position is generally associated with a ready to fire position, and the de-cocked position is generally associated with a post firing, i.e., not-ready to fire position. The trigger assembly 24 may include any trigger assembly 24 commonly known and utilized to fire a weapon. Typically, the trigger assembly 24 includes a housing 46 that supports a trigger 48 and a sear 50. The trigger 48 is engaged to operate the sear 50 through a mechanical connection. However, it should be appreciated that the trigger assembly 24 may be configured in some other manner. When engaged, the sear 50 mechanically latches to the catch 34 of the gas spring assembly 28 to secure the gas spring assembly 28 in the compressed position.

When the trigger assembly 24 is disposed in the cocked position, with the gas spring assembly 28 disposed in the compressed position, actuation of the trigger assembly 24 releases the sear 50 of the trigger assembly 24 from the catch 34 of the gas spring assembly 28, which allows the gas spring assembly 28 to decompress. Decompression of the gas spring assembly 28 compresses the air contained within the compression chamber 36, which fires the projectile.

As noted above, and with reference to FIGS. 1 through 2, the trigger assembly 24 includes the housing 46 supporting the sear 50. Preferably, and as shown, the sear 50 includes a planar portion 52, which presents a latch 54 for engaging an edge 56 on the catch 34 in latching engagement. The planar portion 52, including the latch 54, generally moves in a vertical direction, along a plane of the planar portion 52, as the trigger assembly 24 is moved between the de-cocked position and the cocked position.

Referring to FIGS. 3-6, the gas spring assembly 28 includes the piston 44. The piston 44 includes an annular wall 58 that extends along a longitudinal axis 60 between a rearward end 62 and a forward end 64. The longitudinal axis 60 may alternatively be referred to herein as the central axis. The annular wall 58 of the piston 44 defines the interior pressure chamber 42. The piston 44 further includes an end wall 66, which is disposed at the forward end 64 of the annular wall 58. The end wall 66 may be integrally formed with the annular wall 58, or may be separately formed and fixedly attached to the annular wall 58.

An interior piston tube 68 is disposed within the interior pressure chamber 42 of the piston 44. The interior piston tube 68 includes a first end 70 that is fixed in position relative to and moveable with the end wall 66 of the piston 44, adjacent the forward end 64 of the annular wall 58. The interior piston tube 68 includes a second end 72 that is disposed adjacent the rearward end 62 of the annular wall 58 of the piston 44. The interior piston tube 68 is a cylindrical tube that defines a hollow central section 74.

The interior piston tube 68 has an exterior diameter that is less than an interior diameter of the annular wall 58 of the piston 44. As such, the interior piston tube 68 is radially spaced inward from the annular wall 58 of the piston 44 a separation distance. Because the interior piston tube 68 is disposed within the interior pressure chamber 42 of the piston 44, a first portion of the interior pressure chamber 42 is disposed within the hollow central section 74 of the interior piston tube 68, and a second portion of the interior pressure chamber 42 is disposed radially outside of the interior piston tube 68 relative to the longitudinal axis 60.

The wall of the interior piston tube 68 includes at least one aperture 76, which allows gas to flow into and out of the hollow central section 74 of the interior piston tube 68, within the interior pressure chamber 42 of the piston 44. Accordingly, gas may flow between the first portion of the interior pressure chamber 42, disposed within the hollow central section 74 of the interior piston tube 68, and the second portion of the interior pressure chamber 42, disposed radially outside of the interior piston tube 68.

The interior piston tube 68 may be attached to the piston 44 in any suitable manner, and is moveable with the piston 44 along the longitudinal axis 60. For example and as shown in the Figures, the first end 70 of the interior piston tube 68 is disposed in threaded engagement with the end wall 66 of the piston 44. The end wall 66 of the piston 44 may be threaded into or otherwise securely affixed to the annular wall 58 of the piston 44. The interior piston tube 68 may be manufactured from any rigid material. In an exemplary embodiment, the interior piston tube 68 is a metal, such as but not limited to steel. However, it should be appreciated that other embodiments of the interior piston tube 68 may be manufactured from other, non-metal materials.

The gas spring assembly 28 includes a bushing 78 that is slideably disposed between the annular wall 58 of the piston 44 and the interior piston tube 68. The bushing 78 radially supports the second end 72 of the interior piston tube 68 relative to the annular wall 58 of the piston 44. In operation of the gas spring assembly 28, the piston 44 and the interior piston tube 68 move axially along the longitudinal axis 60, relative to the bushing 78, such that the annular wall 58 of the piston 44 moves over an exterior diameter of the bushing 78, and the interior piston tube 68 moves through an interior diameter of the bushing 78. The bushing 78 includes a first dynamic seal 80 that is operable to seal between the annular wall 58 of the piston 44 and the bushing 78, and a second dynamic seal 82 that is operable to seal between the bushing 78 and the interior piston tube 68.

As noted above, the piston 44 includes the annular wall 58, the end wall 66, and the bushing 78. The annular wall 58 extends a length along the longitudinal axis 60, between the rearward end 62 and the forward end 64. The rearward end 62 is disposed nearer a butt end of the stock than is the forward end 64, and the forward end 64 is disposed nearer a muzzle of the barrel 32 than is the rearward end 62. The annular wall 58 is disposed annularly about the longitudinal axis 60, and defines a radial outer boundary of the interior pressure chamber 42. The end wall 66 is disposed adjacent the forward end 64 of the annular wall 58, and defines a forward axial boundary of the interior pressure chamber 42. The bushing 78 is disposed adjacent the rearward end 62 of the annular wall 58 when the piston 44 is disposed in the uncompressed condition, opposite of the end wall 66 along the longitudinal axis 60, and defines a rearward axial boundary of the interior pressure chamber 42.

Figure 3:
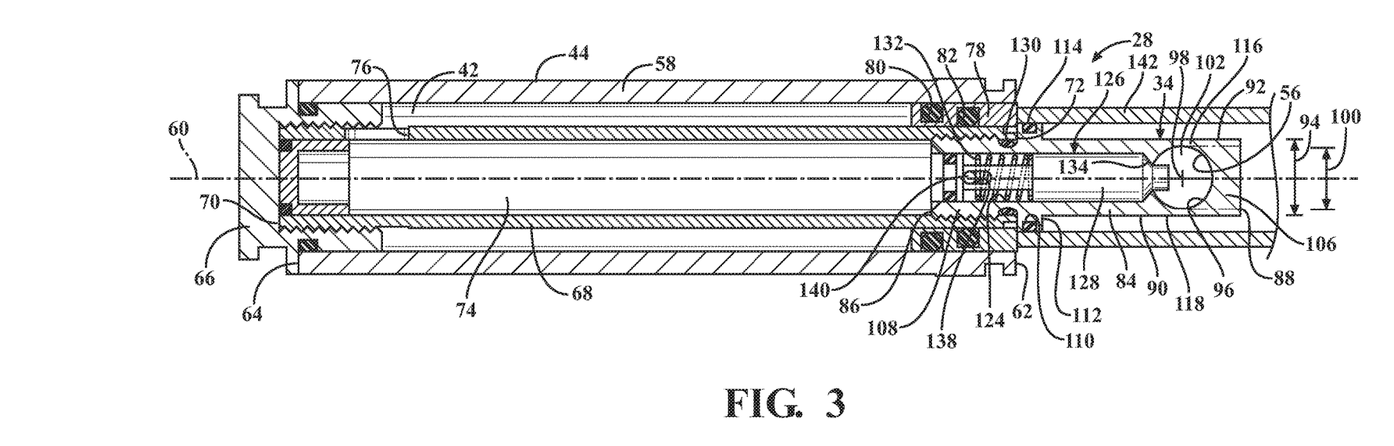
FIG. 3 is a schematic cross sectional view of the gas spring assembly in the un-compressed position shown in FIG. 1.
Figure 4:
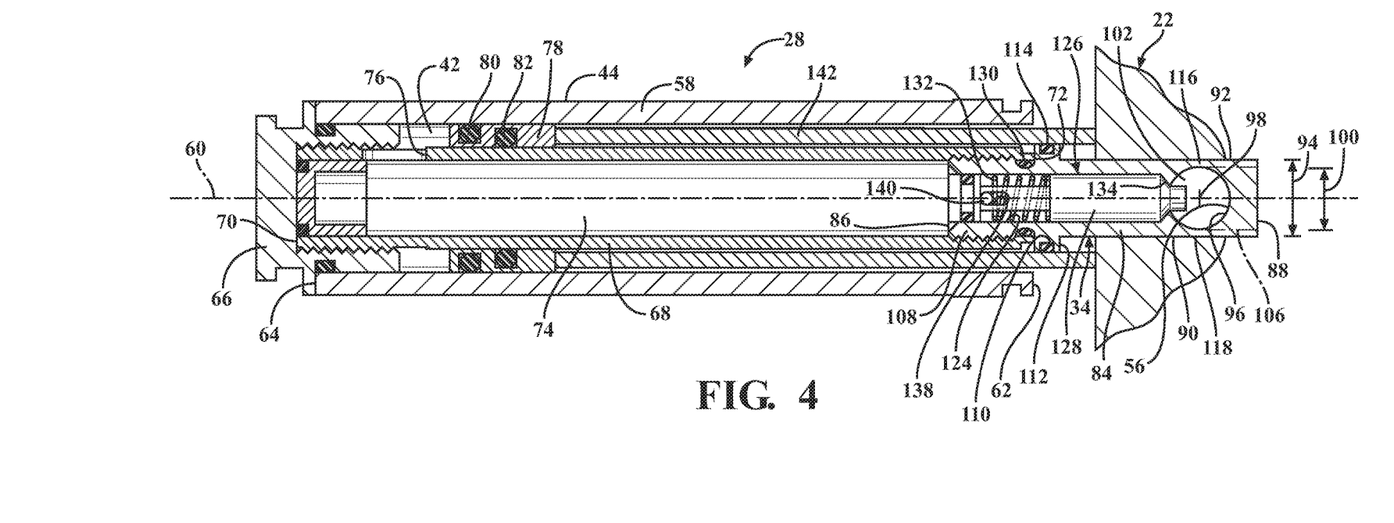
FIG. 4 is a schematic cross sectional view of the gas spring assembly in the compressed position shown in FIG. 3.

As the piston 44 and the interior piston tube 68 move axially along the longitudinal axis 60 relative to the bushing 78, from the un-compressed position shown in FIG. 3, into the compressed position, shown in FIG. 4, the piston 44 and the interior piston tube 68 move relative to the bushing 78, thereby decreasing the volume of the interior pressure chamber 42, and more specifically, the volume of the second portion of the interior pressure chamber 42 that is disposed radially outside of the interior piston tube 68. As the volume of the second portion of the interior pressure chamber 42 is decreased, gases within the second portion of the interior pressure chamber 42 are forced into the first portion of the interior pressure chamber 42, located within the hollow central section 74 of the interior piston tube 74. Decreasing the volume of the interior pressure chamber 42, particularly the second portion of the interior pressure chamber disposed radially outside of the interior piston tube 68, decreases the volume of the gas within the interior pressure chamber 42, including both the first portion of the interior pressure chamber located within the hollow central section 74 of the interior piston tube 68 and the second portion of the interior pressure chamber 42 disposed radially outside of the interior piston tube 68, thereby increasing a fluid pressure of the gas within the interior pressure chamber 42. Compression of the gas within the interior pressure chamber 42 loads the gas spring assembly 28 in preparation for firing the projectile when actuated by the trigger assembly 24.

The gas spring assembly 28 includes the catch 34. As shown in FIG. 2, the sear 50 of the trigger assembly 24 engages the catch 34 of the gas spring assembly 28 in latching engagement to secure the gas spring assembly 28 in the compressed position in preparation for firing the air gun 20, and releases the catch 34 to fire the projectile from the air gun 20. While the catch 34 is described as part of the gas spring assembly 28 and incorporated into the exemplary embodiment of the air gun 20 described herein, it should be appreciated that aspects of the catch 34, may be incorporated into and applied to other types of firearms, such as more traditional firearms that ignite a propellant to fire the projectile. For example, aspects of the catch 34 described herein may be incorporated into a bolt of a rifle, which includes a firing pin 140 used to strike a primer in a cartridge to ignite the propellant. It should be appreciated by those skilled in the art that the teachings related to the catch 34 described herein, and particularly the teachings related to a method used to manufacture the catch 34 described in greater detail below, may be incorporated into or applied to many different styles of firearms, and should not be limited to only air guns 20.

Figure 5:
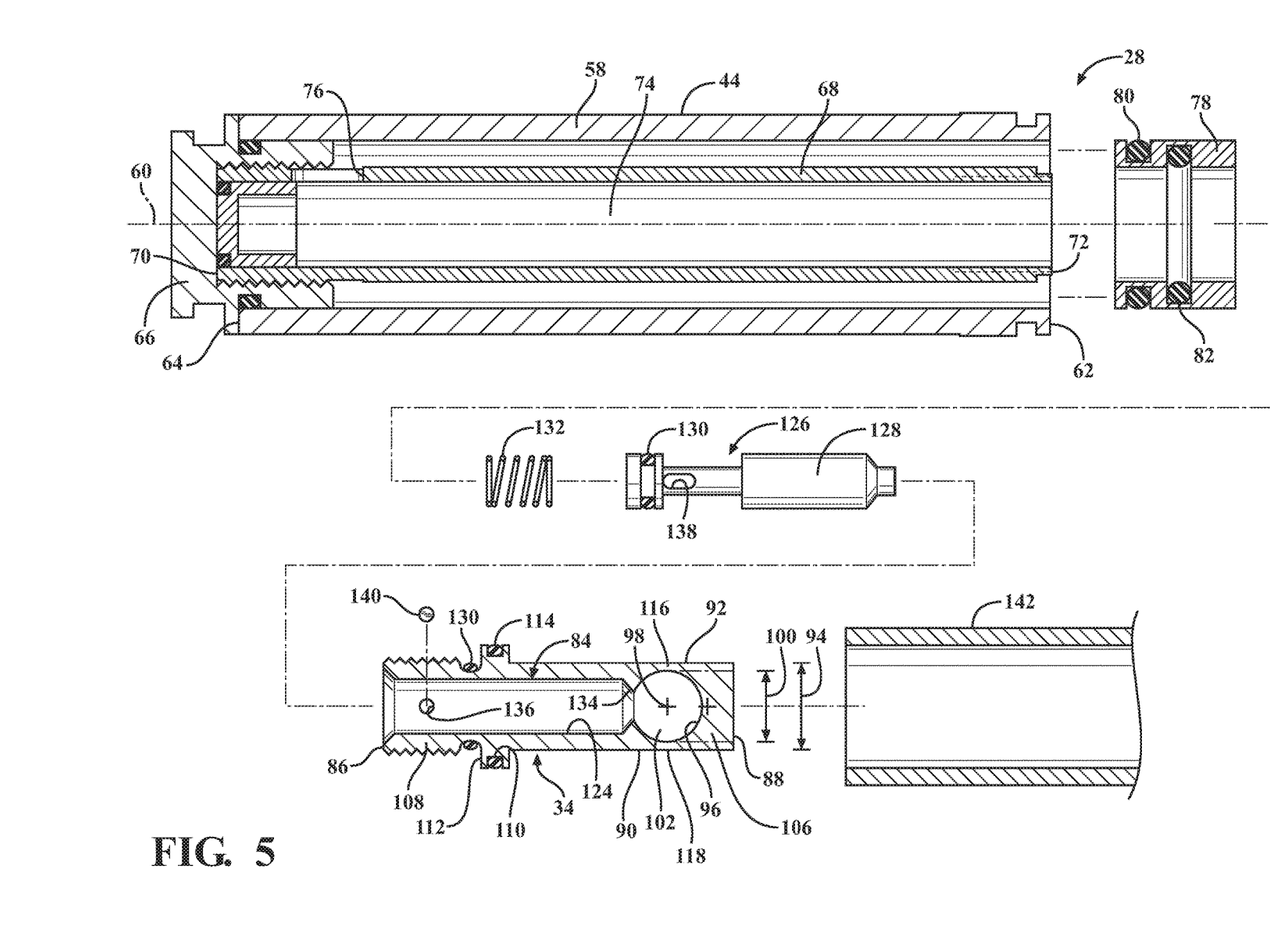
FIG. 5 is an exploded, schematic cross sectional view of the gas spring assembly showing the catch from a bottom side.
Figure 6:
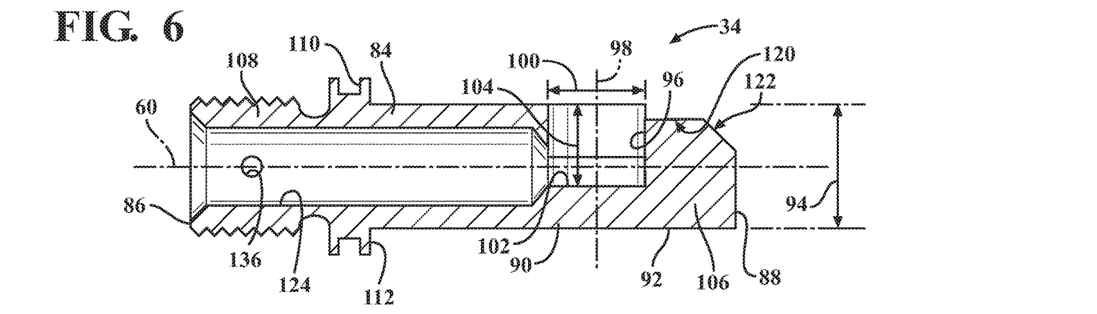
FIG. 6 is a schematic cross sectional view of the catch from a first side.

Referring to FIGS. 5 and 6, the catch 34 includes a body 84 that extends along the longitudinal axis 60. The body 84 of the catch 34 extends between a first end 86 and a second end 88. As shown in the Figures, the first end 86 of the catch 34 is disposed adjacent and attached to the second end 72 of the interior piston tube 68, and the second end 88 of the catch 34 extends outward from the interior piston tube 68, along the longitudinal axis 60, and toward the trigger assembly 24.

The body 84 of the catch 34 includes a cylindrical portion 90, which is disposed near or adjacent the second end 88 of the body 84 of the catch 34. The cylindrical portion 90 defines a circular cross section perpendicular to and concentric with the longitudinal axis 60. The cylindrical portion 90 includes an exterior surface 92 that defines an outer diameter 94.

The catch 34 includes a bore 96 that extends along a bore axis 98 into the cylindrical portion 90 of the body 84 of the catch 34. The bore 96 is shown in the Figures and described herein as the blind bore 96. However, it should be appreciated that the bore 96 does not have to be a blind bore, but may alternatively be a through bore, extending completely through the cylindrical portion 90 of the catch 34. As such, the bore 96 should not be limited to the exemplary embodiment of the blind bore 96 shown and described herein. The bore axis 98 of the blind bore 96 is perpendicular to and intersects the longitudinal axis 60. The blind bore 96 defines a circular cross section perpendicular to and concentric with the bore axis 98. The circular cross section of the blind bore 96 defines a bore diameter 100. The bore diameter 100 of the blind bore 96 is less than the outer diameter 94 of the cylindrical portion 90. Preferably, the bore diameter 100 of the blind bore 96 is less than 80% of the outer diameter 94 of the cylindrical portion 90 of the body 84.

The blind bore 96 includes a bottom wall 102, and extends into the cylindrical portion 90 a depth 104 from the exterior surface 92 to the bottom wall 102. The depth 104 of the blind bore 96 is measured along the bore axis 98, between the bottom wall 102 and an intersection of the bore axis 98 and the exterior surface 92 of the cylindrical portion 90. The depth 104 of the blind bore 96 is less than the outer diameter 94 of the cylindrical portion 90. In an exemplary embodiment, the depth 104 of the blind bore 96 is greater than one half the outer diameter 94 of the cylindrical portion 90. However, it other embodiments, the depth 104 of the blind bore 96 may be less than one half the outer diameter 94 of the cylindrical portion 90.

In the exemplary embodiment shown in the Figures, the body 84 of the catch 34 includes an end portion 106, which is disposed between the blind bore 96 and the second end 88 of the body 84, along the longitudinal axis 60. The end portion 106 defines a cross section perpendicular to the longitudinal axis 60. The cross section of the end portion 106 may be defined as a circle concentric with the longitudinal axis 60, and lacking a circular segment. As used herein, the term "circular segment" is defined as a region of a circle that is "cut-off" from the rest of the circle by a secant or a chord, i.e., a portion of a circle whose upper boundary is an arc and whose lower boundary is a chord making a central angle of less than 180°.

In the exemplary embodiment shown in the Figures, the body 84 of the catch 34 includes a base portion 108 that is disposed between the first end 86 of the body 84 and the blind bore 96, along the central axis. The base portion 108 is generally cylindrical, but may include an annular groove 110 recessed into the body 84 of the catch 34 for receiving and positioning a catch seal 114 therein, and an annular flange 112 extending radially outward from the body 84 of the catch 34 for abutting the bushing 78 and securing the bushing 78 within the interior pressure chamber 42 of the piston 44, and between the interior piston tube 68 and the annular wall 58 of the piston 44.

In the exemplary embodiment shown, the body 84 of the catch 34 further includes at least one wall portion that extends between the base portion 108 and the end portion 106, and partially forms the blind bore 96. More specifically, in the exemplary embodiment shown, the catch 34 includes a first wall portion 116 and a second wall portion 118 disposed opposite each other on opposing sides of the blind bore 96. The first wall portion 116 and the second wall portion 118 partially form sidewalls of the blind bore 96. As described above, the bore axis 98 is perpendicular to and intersects the central or longitudinal axis 60 of the body 84 of the catch 34. Additionally, as described above, the bore diameter 100 of the blind bore 96 is less than the outer diameter 94 of the cylindrical portion 90 of the body 84 of the catch 34. Accordingly, as the blind bore 96 is formed into the cylindrical portion 90, there is a depth 104 of the blind bore 96 at which a chord of the cylindrical portion 90 of the body 84 is equal to bore diameter 100. This depth 104 will vary depending upon the relative size of the bore diameter 100 to the outer diameter 94 of the cylindrical portion 90 of the body 84. Below this depth 104, the bore diameter 100 is less than the chord of the cylindrical portion 90, thereby leaving a portion of the cylindrical portion 90 that forms the first wall portion 116 and the second wall portion 118. Due to the radius of the cylindrical portion 90 of the body 84, when viewed from a side of the catch 34, the first wall portion 116 and the second wall portion 118 include a top edge 56 that forms a concave edge 56. As noted above, the first side wall and the second side wall extend between and connect the base portion 108 and the end portion 106 of the catch 34, thereby increasing the strength of the catch 34.

The blind bore 96 includes and/or defines the edge 56, which the sear 50 of the trigger assembly 24 engages to latch 54 the catch 34 to the trigger assembly 24. The edge 56 of the blind bore 96 that the sear 50 engages is disposed at the exterior surface 92 of the cylindrical surface, at an intersection of the end portion 106 and the lip or edge 56 of the blind bore 96 at the exterior surface 92 of the body 84. As best shown in FIG. 6, the end portion 106 of the body 84 may be formed to include a planar surface 120 disposed parallel to the longitudinal axis 60, and laterally spaced between the longitudinal axis 60, and a distance less than the radius of the cylindrical portion 90 of the body 84. Additionally, the end portion 106 of the body 84 may be formed to include an inclined surface 122 that intersects the planar surface 120 and the longitudinal axis 60. The planar surface 120 and the inclined surface 122 may be sized and/or shaped to facilitate and/or improve the latching engagement between the sear 50 of the trigger assembly 24 and the edge 56 of the blind bore 96 against which the sear 50 latches.

Referring to FIGS. 5 and 6, the body 84 of the catch 34 may further include a longitudinal bore 124, that is disposed concentric with the central or longitudinal axis 60, and which extends between the first end 86 of the body 84 and the blind bore 96. The longitudinal bore 124 provides a fluid flow path between the first end 86 of the body 84 and the blind bore 96.

As shown in the exemplary embodiment, a valve mechanism 126 is disposed within the longitudinal bore 124. The valve mechanism 126 is operable to allow fluid flow of a pressurized fluid from the blind bore 96 through the first end 86 of the body 84 and into the interior pressure chamber 42 of the piston 44, and block fluid flow of the pressurized fluid from the interior pressure chamber 42 of the piston 44, through the first end 86 of the body 84, and exiting through the blind bore 96.

The valve mechanism 126 includes a valve member 128 that is slideably disposed within the longitudinal bore 124. The valve member 128 is axially moveable within the longitudinal bore 124, relative to the body 84 of the catch 34, along the longitudinal axis 60. The valve member 128 moves between a closed position to block or prevent fluid flow through the longitudinal bore 124, and an open position to allow fluid flow through the longitudinal bore 124. The valve mechanism 126 includes a dynamic seal 130 that is operable to seal between the valve member 128 and the longitudinal bore 124 in the body 84 of the catch 34.

The valve mechanism 126 includes a spring 132, such as but not limited to a coil spring 132, that is disposed within the longitudinal bore 124. The spring 132 biases the valve member 128 toward and into the closed position, i.e., into sealing engagement with a valve seat 134 formed adjacent the blind bore 96. The body 84 of the catch 34 defines an annular bore 136 extending across the body 84 of the catch 34, and through the longitudinal bore 124. Preferably, the annular bore 136 extends perpendicular to and intersects the longitudinal axis 60. The valve member 128 defines an elongated passage 138 that extends across or through the valve member 128, perpendicular to the longitudinal axis 60, and is elongated in a direction along the longitudinal axis 60.

A pin 140 extends through the annular bore 136 in the body 84 of the catch 34, and through the elongated passage 138 of the valve member 128. The pin 140 secures the valve member 128 within the longitudinal bore 124 of the body 84. The valve member 128 is moveable along the longitudinal axis 60 and within the longitudinal bore 124 relative to the pin 140, such that the pin 140 is moveable within the elongated passage 138 of the valve member 128. The movement of the valve member 128 relative to the pin 140, along the axial distance of the elongated passage 138, allows the valve member 128 to move relative to the body 84 of the catch 34 between the closed position and the open position.

Having the valve mechanism 126 disposed within the catch 34 of the gas spring assembly 28 allows the gas spring assembly 28 to be charged with a pressurized fluid. By placing the catch 34 in a suitable configured receiver, compressed gas, such as air, may be introduced into the blind bore 96 of the catch 34. The pressurized gas biases against the valve member 128, and moves the valve member 128 along the longitudinal axis 60, from the closed position into the open position, thereby compressing the spring 132. When the supply of compressed gas is disconnected from the blind bore 96, the pressurized gas within the interior pressure chamber 42 of the piston 44 urges the valve member 128 from the open position into the closed position, thereby sealing the valve member 128 and trapping the pressurized gas within the interior pressure chamber 42 of the piston 44.

Referring to FIGS. 1 and 2, the gas spring assembly 28 further includes a tubular press 142, which is disposed in abutting engagement with the bushing 78. The tubular press 142 is operable to press against a static member of the air gun 20, such as but not limited to the trigger assembly 24, and the bushing 78. The tubular press 142 maintains an axial position of the bushing 78 relative to the longitudinal axis 60 as the piston 44, the interior piston tube 68, and the catch 34 are moved from the un-cocked position into the cocked position. The tubular press 142 may be formed to slideably fit over the annular flange 112 of the catch 34, such that the annular flange 112 radially supports an axial end of the tubular press 142. The tubular press 142 may be constructed and/or manufactured from any suitably rigid material, but is preferably manufactured from suitable damping material, such as a plastic.

As shown in FIG. 1, the catch 34 is de-coupled from the sear 50 of the trigger assembly 24 when the trigger assembly 24 is in the de-cocked position and the piston 44 is in the un-compressed position. As shown in FIG. 2, the catch 34 is releasably coupled to the sear 50 of the trigger assembly 24 when the trigger assembly 24 is in the cocked position, and the piston 44 is in the compressed position. Axial movement of the piston 44 along the longitudinal axis 60, from the un-compressed position into the compressed position, moves the piston 44, the interior piston tube 68, and the catch 34 along the longitudinal axis 60. The tubular press 142, which is disposed between the bushing 78 and the static member of the air gun 20, prevents the bushing 78 from moving with the piston 44 and the interior piston tube 68, thereby causing the bushing 78 to maintain its axial position along the longitudinal axis 60. As the piston 44 and the interior piston tube 68 move along the longitudinal axis 60, relative to the bushing 78, the volume within the interior pressure chamber 42 is reduced, thereby increasing the fluid pressure of the gas within the interior pressure chamber 42. Moving the piston 44, the interior piston tube 68, and the catch 34 from the un-cocked position into the cocked position, brings the catch 34 into pressing engagement with the sear 50, and moves the sear 50 from the de-cocked position into the cocked position. As the sear 50 moves from the de-cocked position into the cocked position, the latch 54 of the sear 50 engages the edge 56 of the catch 34 in latched engagement to secure the catch 34, and thereby the piston 44, within the compression chamber 36 relative to the trigger housing 22.

Referring to FIGS. 1 and 2, Actuation of the trigger assembly 24 from the cocked position to the de-cocked position de-couples the latch 54 of the sear 50 from the edge 56 of the catch 34 of the gas spring assembly 28. De-coupling the sear 50 of the trigger assembly 24 from the catch 34 permits the compressed air within the interior pressure chamber 42 to decompress or expand the gas spring assembly 28, which moves the piston 44 along the longitudinal axis 60, thereby compressing the air within the compression chamber 36, which in turn propels the projectile out of the barrel 32.

A method of manufacturing the catch 34 is also described herein. As noted above, the catch 34 may be incorporated into and/or used to engage the sear 50 of the trigger assembly 24 in many different types of firearms, and is not limited to the exemplary embodiment of the air gun 20 described herein. The method includes providing the body 84 of the catch 34. As noted above, the body 84 of the catch 34 includes at least the cylindrical portion 90, which includes a circular cross section perpendicular to and concentric with the central or longitudinal axis 60. The body 84 of the catch 34 may be provided in any suitable manner, such as by providing suitable bar stock into a three dimensional milling machine. It should be appreciated that the body 84 of the catch 34 may be provided to include other features necessary to fit the catch 34 into a specific style and/or configuration of firearm.

Figure 7:
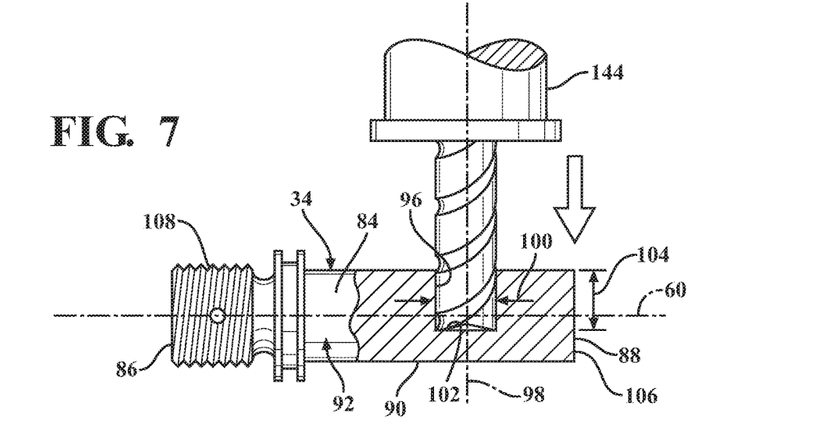
FIG. 7 is a schematic cross sectional view of the catch, showing an end mill plunged into the catch to form a blind bore.

Once the body 84 of the catch 34 is provided, it is placed into a milling machine, as is known in the art. Referring to FIG. 7, an end mill 144 is then plunged into the cylindrical portion 90 of the body 84, along the bore axis 98, to form the blind bore 96. As described above, the blind bore 96 includes the circular cross section perpendicular to and concentric with the bore axis 98, and defines the bore diameter 100 that is less than the outer diameter 94 of the cylindrical portion 90. As used herein, the term "end mill 144" is defined as a type of milling cutter, i.e., a cutting tool that can cut in three dimensions, including axially along an axis of the end mill 144, as well as laterally relative to the axis of the end mill 144. As used herein, the term "plunge", or "plunging", or "plunged" is defined as a milling operation in which a cutting tool is moved axially along an axis of the milling tool to remove material in an axial direction.

The end mill 144 is plunged into the cylindrical portion 90 of the body 84 of the catch 34 the depth 104 of the blind bore 96. As noted above, the depth 104 is measured from the bottom wall 102 of the blind bore 96 to the intersection of the bore axis 98 and the exterior surface 92 of the cylindrical body 84. The depth 104 is less than the outer diameter 94. In some embodiments, the depth 104 is greater than one half the outer diameter 94. Once the end mill 144 has been plunged into the cylindrical portion 90 of the body 84 of the catch 34 to form the blind bore 96, the end mill 144 is retracted from the blind bore 96. The end mill 144 may be completely retracted from the blind bore 96, i.e., retracted a distance greater than the depth 104 that the end mill 144 was plunged into the cylindrical portion 90 of the body 84.

Figure 8:
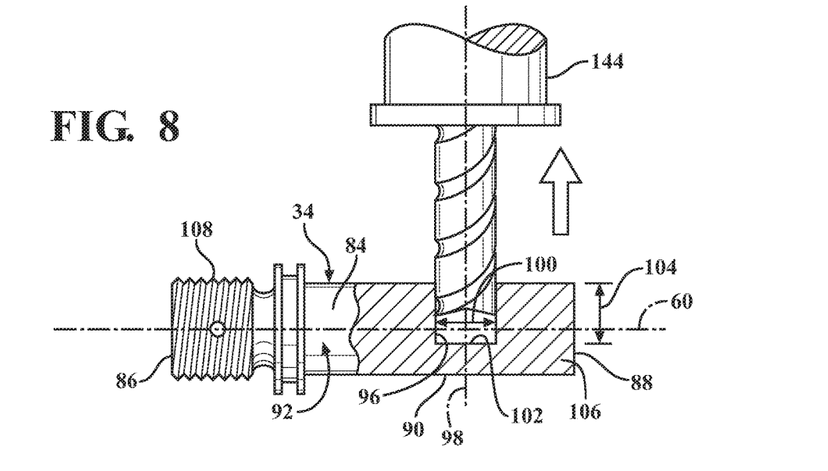
FIG. 8 is a schematic cross sectional view of the catch, showing the end mill partially retracted after forming the blind bore.
Figure 9:
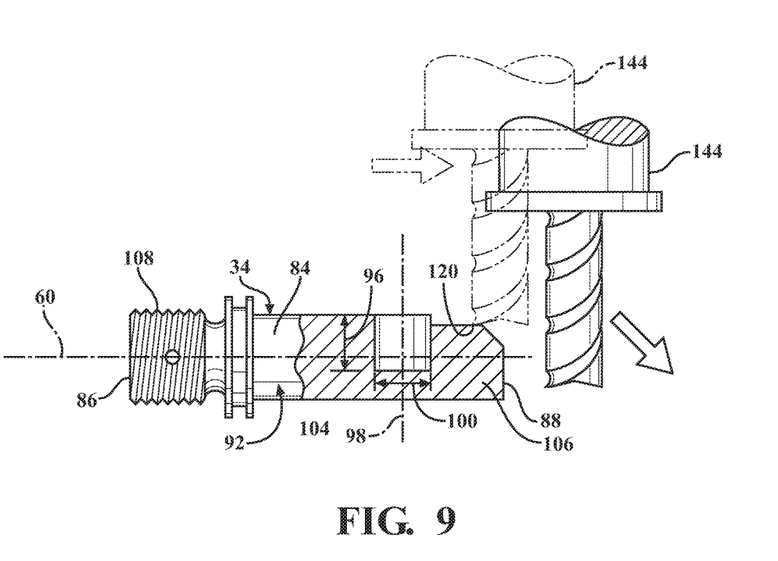
FIG. 9 is a schematic cross sectional view of the catch, showing the end mill milling off an end portion of the catch.

Alternatively, with reference to FIG. 8, if the end portion 106 of the catch 34 is to be formed to include the planar surface 120 and/or the inclined surface 122, such as shown in the exemplary embodiment shown and described herein, the end mill 144 may be retracted a distance that is less than the depth 104 that the end mill 144 was plunged into the cylindrical portion 90. After retracting the end mill 144 a distance less than the depth 104 that the end mill 144 was plunged into the cylindrical portion 90 of the body 84, the end mill 144 is moved axially along the longitudinal axis 60, relative to the body 84 of the catch 34 and toward the second end 88 of the body 84, such as shown in FIG. 9. By moving the end mill 144 axially along the longitudinal axis 60, the end mill 144 may mill off a circular segment of the end portion 106 of the body 84, thereby forming the planar surface 120. In order to form the inclined surface 122, the end mill 144 is simultaneously moved axially along the longitudinal axis 60 and perpendicularly toward the longitudinal axis 60, thereby forming the inclined surface 122 of the end portion 106.

As noted above, the sear 50 of the trigger assembly 24 engages the lip or edge 56 of the blind bore 96 disposed at the exterior surface 92 of the body 84 of the catch 34, nearest the second end 88 of the body 84 of the catch 34. The above described method is an easy process that may be used to form the catch 34, using only the most basic end mill 144 tool. Additionally, the resultant catch 34 provided by this process includes the first wall portion 116 and the second wall portion 118, which interconnect the base portion 108 and the end portion 106 and strengthen the body 84 of the catch 34.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

The invention claimed is:

1. A gas spring assembly for an air gun, the gas spring assembly comprising:
   a piston having an annular wall extending along a longitudinal axis between a rearward end and a forward end, and defining an interior pressure chamber;
   an interior piston tube disposed within the interior pressure chamber, and including a first end fixedly attached to the forward end of the piston, and a second end disposed adjacent the rearward end of the annular wall of the piston;
   wherein the interior piston tube includes a hollow central section;
   wherein the interior piston tube includes at least one aperture extending radially through the interior piston tube to provide fluid communication between the hollow central section of the interior piston tube and a portion of the interior pressure chamber disposed radially outside of the interior piston tube relative to the longitudinal axis;
   a bushing moveable along the longitudinal axis relative to both of the annular wall of the piston and the interior piston tube, and radially supporting the interior piston tube relative to the annular wall of the piston;
   wherein the bushing is disposed in sealing engagement with both the annular wall of the piston and the interior piston tube;
   a catch including a body extending along the longitudinal axis, between a first end and a second end, with the first end of the body attached to the second end of the interior piston tube; and
   wherein the catch includes an edge operable to engage a sear of a trigger assembly in latching engagement.

2. The gas spring assembly set forth in claim 1, wherein movement of the piston and the interior piston tube along the longitudinal axis and relative to the bushing forces gas within the portion of the interior pressure chamber disposed radially outside of the interior piston tube through the at least one aperture and into the hollow central section of the interior piston tube, and compresses the gas within the interior pressure chamber and the hollow central section of the interior piston tube.

3. The gas spring assembly set forth in claim 1, wherein the body of the catch includes a cylindrical portion disposed adjacent the second end of the body, wherein the cylindrical portion defines a circular cross section perpendicular to and concentric with the longitudinal axis, and includes an exterior surface defining an outer diameter.

4. The gas spring assembly set forth in claim 3, wherein the catch includes a bore extending along a bore axis into the cylindrical portion of the body, wherein the bore defines a circular cross section having a bore diameter, perpendicular to and concentric with the bore axis.

5. The gas spring assembly set forth in claim 4, wherein the bore diameter of the bore is less than the outer diameter of the cylindrical portion.

6. The gas spring assembly set forth in claim 4 wherein the bore axis of the bore is perpendicular to and intersects the longitudinal axis.

7. The gas spring assembly set forth in claim 4, wherein the bore is a blind bore having a bottom wall.

8. The gas spring assembly set forth in claim 7, wherein the blind bore extends into the cylindrical portion a depth from the exterior surface to the bottom wall, wherein the depth is measured along the bore axis between the bottom wall and an intersection of the bore axis and the exterior surface of the cylindrical portion, and wherein the depth is less than the outer diameter of the cylindrical portion.

9. The gas spring assembly set forth in claim 8, wherein the depth is greater than one half the outer diameter of the cylindrical portion.

10. The gas spring assembly set forth in claim 4, wherein the body includes an end portion disposed between the bore and the second end of the body, along the longitudinal axis.

11. The gas spring assembly set forth in claim 10, wherein the body includes a base portion disposed between the first end of the body and the bore along the longitudinal 1 axis.

12. The gas spring assembly set forth in claim 11, wherein the body includes at least one wall portion extending between the base portion and the end portion, and partially forming the bore.

13. The gas spring assembly set forth in claim 12, wherein the at least one wall portion includes a first wall portion and a second wall portion disposed opposite each other on opposing sides of the bore.

14. The gas spring assembly set forth in claim 10, wherein the end portion defines a cross section perpendicular to the longitudinal axis, wherein the cross section of the end portion is defined as a circle concentric with the longitudinal axis and lacking a circular segment.

15. The gas spring assembly set forth in claim 14, wherein the edge of the catch is an edge of the bore disposed adjacent the end portion.

16. The gas spring assembly set forth in claim 4, wherein the body of the catch includes a longitudinal bore concentric with the longitudinal axis, and extending between the first end of the body and the bore.

17. The gas spring assembly set forth in claim 16, further comprising a valve mechanism disposed within the longitudinal bore, and operable to allow fluid flow of a pressurized fluid from the bore through the first end of the body and into the interior pressure chamber of the piston, and block fluid flow of the pressurized fluid from the first end of the body and through the bore.

18. The gas spring assembly set forth in claim 17, wherein the valve mechanism includes a valve member slideably disposed within the longitudinal bore for axial movement along the longitudinal axis, between a closed position and an open position.

19. The gas spring assembly set forth in claim 18, wherein the valve mechanism includes a spring disposed within the longitudinal bore, and biasing the valve member toward the bore, and into the closed position.

20. The gas spring assembly set forth in claim 19, wherein the body of the catch defines an annular bore extending across the body and through the longitudinal bore, perpendicular to the longitudinal axis.

21. The gas spring assembly set forth in claim 20, wherein the valve member defines an elongated passage extending across the valve member, perpendicular to the longitudinal axis, and elongated along the longitudinal axis.

22. The gas spring assembly set forth in claim 21, wherein the valve mechanism includes a pin extending through the annular bore in the body of the catch and the elongated passage of the valve member for securing the valve member within the longitudinal bore of the body, wherein the pin is moveable within the elongated passage of the valve member to allow the valve member to move relative to the body of the catch between the closed position and the open position.

23. The gas spring assembly set forth in claim 22, wherein the valve mechanism includes a dynamic seal operable to seal between the valve member and the longitudinal bore in the body of the catch.

24. The gas spring assembly set forth in claim 1, wherein the bushing includes a first dynamic seal operable to seal between the annular wall of the piston and the bushing, and a second dynamic seal operable to seal between the bushing and the interior piston tube.

25. The gas spring assembly set forth in claim 1, further comprising a tubular press disposed in abutting engagement with the bushing, and operable to press against a static member and the bushing to maintain an axial position of the bushing relative to the longitudinal axis as the piston, the interior piston tube, and the catch are moved from an un-cocked position into a cocked position, relative to the bushing.

* * * * *